No. 789,353. PATENTED MAY 9, 1905.
A. G. BETTS.
PLANT FOR THE ELECTRODEPOSITION OF METALS.
APPLICATION FILED APR. 11, 1904.
2 SHEETS—SHEET 1.
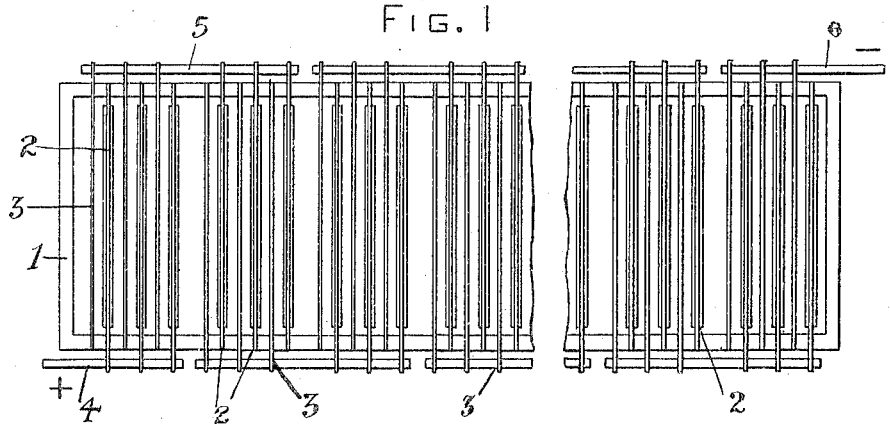
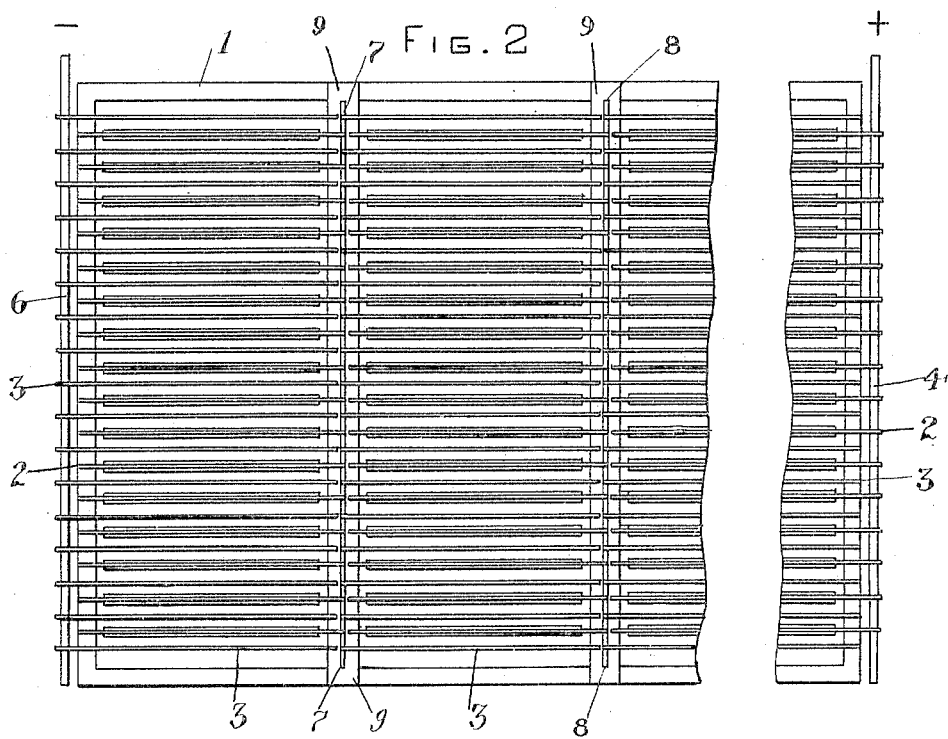
WITNESSES
Edward F. Kern.
William Valentine
INVENTOR
Anson G. Betts No. 789,353. PATENTED MAY 9, 1905.
A. G. BETTS.
PLANT FOR THE ELECTRODEPOSITION OF METALS.
APPLICATION FILED APR. 11, 1904.
2 SHEETS—SHEET 2.
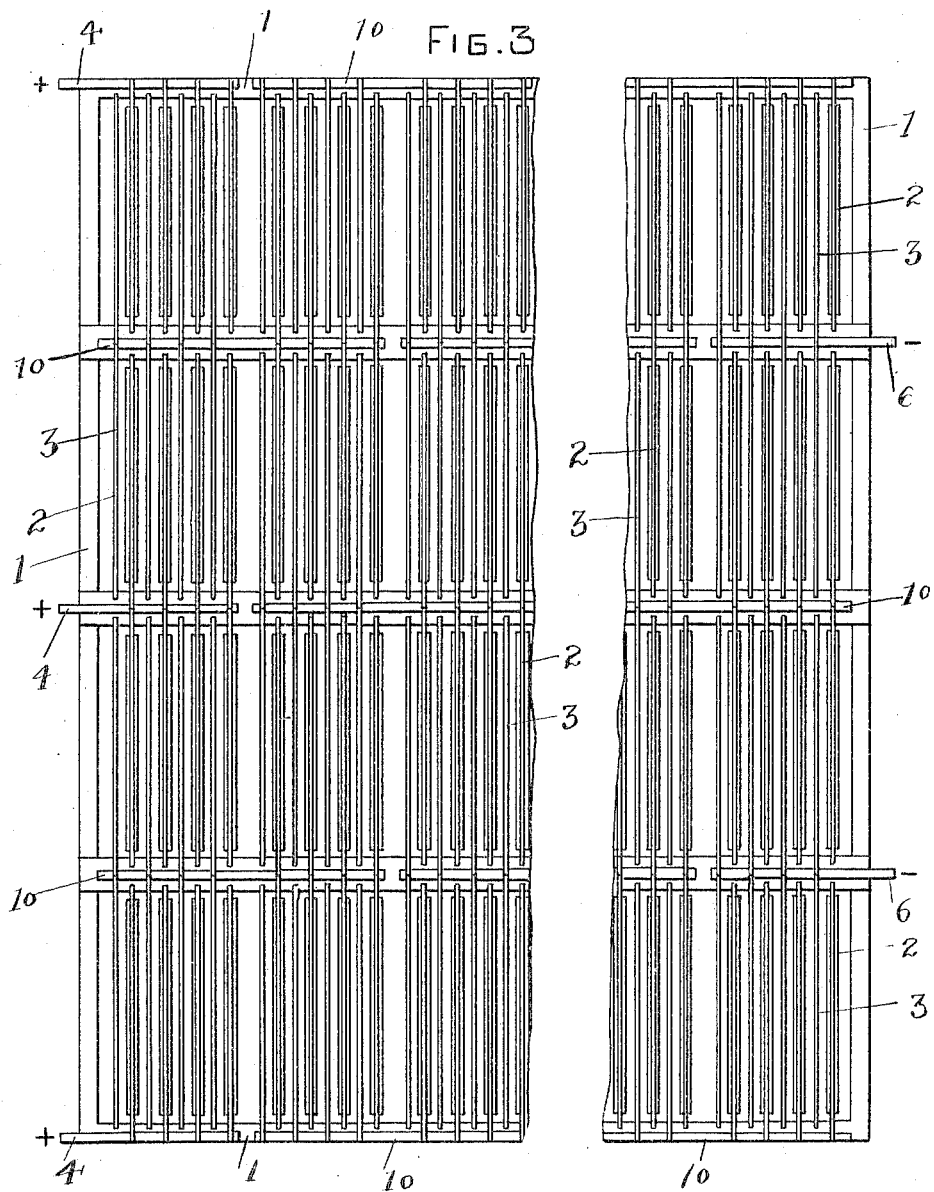
WITNESSES
Edward J. Kerr.
William Valentine
INVENTOR
Anson G. Betts No. 789,353.

Patented May 9, 1905.

UNITED STATES PATENT OFFICE.

ANSON GARDNER BETTS, OF TROY, NEW YORK.

PLANT FOR THE ELECTRODEPOSITION OF METALS.

SPECIFICATION forming part of Letters Patent No. 789,353, dated May 9, 1905.

Application filed April 11, 1904. Serial No. 202,601.

*To all whom it may concern:*

Be it known that I, ANSON GARDNER BETTS, a citizen of the United States, and a resident of Troy, county of Rensselaer, and State of New York, have invented certain new and useful Improvements in Plants for the Electrodeposition of Metals, of which the following is a specification accompanied by drawings.

Figure 1 of the drawings is a view in top plan, illustrating an electrolytic metal-depositing tank and an arrangement of electrodes therein according to my invention. Figs. 2 and 3 are also views in top plan, illustrating alternative forms of tanks and arrangement of electrodes.

My invention relates to a plant for electrodepositing metals, making use of a novel arrangement of electrodes which permits of the use of very large tanks.

The object of the present invention is to reduce either the size or the cost of an electrolytic metal-depositing plant, or both, particularly of an electrolytic metal-refinery.

Heretofore two arrangements of electrodes have been in use, known as the "series" system and the "multiple" system.

My invention consists partly in employing in a single tank in electrical series sets of electrodes arranged in multiple, whereby I obtain most of the advantages of both systems and other advantages in addition. This arrangement enables me to employ currents of a volume which it is practicable to generate and conduct to tanks, a current of five thousand amperes, for example, being considered about as large as it is practicable to employ in metal-depositing in tanks of any desired size, so that the depositing plant may be more in the nature of a flooded floor on which the operations are carried out than the usual large number of individual tanks. The elimination of a large number of tank sides and ends and the intervening spaces saves in cost of construction and in space.

My invention is of special advantage in an electrolytic lead-refinery, as a metallic lining which prevents leaks is expensive, and other methods of making tight tanks require thick sides and bottoms, with the consequence of loss of space.

In Fig. 1 I have shown one arrangement of electrodes that may be used in my invention. 1 is a tank of any desired length with central part removed, containing the electrolytic solution from which metal is deposited and anodes 2 and cathodes 3. The current enters through the positive bus-bar 4, passes to the anodes in electric connection therewith, flows through the solution to the adjacent cathodes, and thence through the collecting and distributing conductor 5 to the next group of anodes, &c., through the length of the tank, passing out through the negative bus-bar 6. By leaving a double space between the anode of one block of electrodes in multiple and the cathode of the next block of electrodes in multiple, as shown, and so doubling the local resistance there is obtained an equal flow of electric current from both sides of all electrodes, with the exception of an anode on one end and a cathode on the other.

In Fig. 2 I have shown the preferred arrangement of electrodes in my invention. The current passes out through the negative bus-bar 6, to which it flows from the nearest group of the cathodes 3, to which it passes through the electrolyte from the intermediately-placed anodes 2, being supplied by means of the collecting and distributing conductor 7, drawing current from the next row of anodes, and so on through the tank supplied by the positive bus-bar 6. The collecting and distributing conductors 7 and 8 are supported on non-conducting supports 9, running transversely of the tank.

Fig. 3 shows another arrangement similar to that shown in Fig. 1, consisting, essentially, of a series of arrangements as shown in Fig. 1, arranged side by side, with the intervening tank-walls removed. The current enters by the positive bus-bars 4, from which it flows to the anodes of the nearest groups, flowing thence through the solution to the corresponding cathodes and to the nearest cathodes of the next groups, and so forth to the other end of the tank, passing out through the negative bus-bar 6. Non-conducting supports 9 run parallel the entire length of the tank and carry the conducting and distributing bars 10, and also support the electrically-unconnected ends of the anodes and cathodes, as shown.

If the electrodes are of the usual size (about three feet deep and two feet wide) and a current density of ten amperes per square foot is used, the tank illustrated in Fig. 1 is suitable for about three hundred and sixty amperes, and those illustrated in Figs. 2 and 3 are suitable for a current of about nineteen hundred and twenty amperes.

My tank is a series tank in which the majority of the electrodes are submitted to electrolysis equally from both sides.

Instead of the usual series arrangement of allowing the current to pass directly through the plate or through a conductor from one side to another of a built-up plate the faces of which are more or less insulated one from the other, so that one side is an anode and the other a cathode, I conduct the current through a special conductor from one electrolyzing-plate, both sides of which act as cathode, to another electrolyzing-plate in the same tank, both sides of which act as anode.

Other arrangements than those shown in the drawings are possible in my invention.

What I claim as new, and desire to secure by Letters Patent, is—

1. An electrolytic metal-depositing plant containing a plurality of tanks, each of which contains in electrical series sets of positive and negative unipolar electrodes, said sets arranged internally in multiple, substantially as described.

2. An electrolytic metal-depositing tank, containing in electrical series sets of positive and negative unipolar electrodes, said sets arranged internally in multiple, substantially as described.

3. The combination with a containing-tank, containing a lead-depositing electrolyte, and arranged therein in electrical series, a plurality of sets of electrodes arranged in multiple.

In testimony whereof I have signed my name to this specification in the presence of two subscribing witnesses.

ANSON GARDNER BETTS.

Witnesses:
EDWARD F. KERN,
WILLIAM VALENTINE.